United States Patent
Glenn et al.

(10) Patent No.: US 9,548,894 B2
(45) Date of Patent: Jan. 17, 2017

(54) PROXIMITY BASED CROSS-SCREEN EXPERIENCE APP FRAMEWORK FOR USE BETWEEN AN INDUSTRIAL AUTOMATION CONSOLE SERVER AND SMART MOBILE DEVICES

(71) Applicant: YOKOGAWA ELECTRIC CORPORATION, Musashino-shi, Tokyo (JP)

(72) Inventors: Timothy Glenn, Flower Mound, TX (US); Patrick Clay, Frisco, TX (US)

(73) Assignee: YOKOGAWA ELECTRIC CORPORATION, Tokyo (JP)

( * ) Notice: Subject to any disclaimer, the term of this patent is extended or adjusted under 35 U.S.C. 154(b) by 316 days.

(21) Appl. No.: 14/297,939

(22) Filed: Jun. 6, 2014

(65) Prior Publication Data
US 2015/0358203 A1    Dec. 10, 2015

(51) Int. Cl.
| | |
|---|---|
| G06F 3/00 | (2006.01) |
| H04L 12/24 | (2006.01) |
| G06Q 10/10 | (2012.01) |
| H04L 29/08 | (2006.01) |
| G06F 3/0482 | (2013.01) |
| G06F 3/01 | (2006.01) |
| G06F 3/0488 | (2013.01) |

(52) U.S. Cl.
CPC ......... *H04L 41/0816* (2013.01); *G06F 3/0482* (2013.01); *G06Q 10/101* (2013.01); *H04L 67/104* (2013.01); *H04L 67/18* (2013.01); *G06F 3/0488* (2013.01); *H04L 41/22* (2013.01)

(58) Field of Classification Search
CPC ... G06F 3/0482; G06Q 10/101; H04L 67/104; H04L 41/0816
See application file for complete search history.

(56) References Cited

U.S. PATENT DOCUMENTS

| | | | |
|---|---|---|---|
| 5,611,059 A * | 3/1997 | Benton | G05B 19/0426 700/17 |
| 5,832,496 A * | 11/1998 | Anand | G06F 17/30554 |
| 6,144,962 A * | 11/2000 | Weinberg | G06F 11/32 |
| 6,212,524 B1 * | 4/2001 | Weissman | G06F 17/30592 707/600 |
| 6,222,540 B1 * | 4/2001 | Sacerdoti | G06F 17/30554 345/440 |

(Continued)

OTHER PUBLICATIONS

Xbox SmartGlass, http://www.xbox.com/en-US/smartglass.

(Continued)

*Primary Examiner* — Nicholas Augustine
(74) *Attorney, Agent, or Firm* — Sughrue Mion, PLLC

(57) ABSTRACT

A system and method for a Graphic User Interface used as the human machine interface (HMI) for Industrial Automation (IA) systems. The system and method use a peer-to-peer session framework between a console with one or more physically connected displays within a control room environment and a companion device. One or more embodiments of the disclosure relate to control of a console, or first device, in a control room by means of a companion device, or second device, through a peer to peer session framework. The use of the second device may provide additional capabilities beyond the pre-purposed capability provided by a dedicated Operator keyboard of the console server.

16 Claims, 7 Drawing Sheets

(56) References Cited

U.S. PATENT DOCUMENTS

| | | | | |
|---|---|---|---|---|
| 6,353,446 B1* | 3/2002 | Vaughn | H04L 41/22 | 709/203 |
| 6,377,993 B1* | 4/2002 | Brandt | G06F 11/0709 | 707/E17.107 |
| 6,643,661 B2* | 11/2003 | Polizzi | G06F 17/30873 | 707/709 |
| 6,668,253 B1* | 12/2003 | Thompson | G06Q 10/06 | |
| 6,678,634 B1* | 1/2004 | Wendt | B21B 38/04 | 702/162 |
| 6,714,219 B2* | 3/2004 | Lindhorst | G06F 8/34 | 715/746 |
| 6,757,681 B1* | 6/2004 | Bertram | H04L 43/022 | |
| 6,832,263 B2* | 12/2004 | Polizzi | G06F 17/30873 | 707/999.101 |
| 6,889,096 B2* | 5/2005 | Spriggs | G05B 15/02 | 340/3.71 |
| 6,895,409 B2* | 5/2005 | Uluakar | G06F 8/20 | 707/769 |
| 6,918,091 B2* | 7/2005 | Leavitt | G06F 3/04817 | 715/765 |
| 6,941,311 B2* | 9/2005 | Shah | G06F 17/30492 | |
| 7,030,890 B1* | 4/2006 | Jouet | G06F 9/4443 | 345/589 |
| 7,228,187 B2* | 6/2007 | Tich | G05B 19/41875 | 700/181 |
| 2002/0095651 A1* | 7/2002 | Kumar | G06F 9/547 | 717/104 |
| 2002/0123915 A1* | 9/2002 | Denning | G06Q 10/063 | 705/7.11 |
| 2002/0138527 A1* | 9/2002 | Bell | G06Q 10/10 | 715/255 |
| 2003/0020671 A1* | 1/2003 | Santoro | G06F 3/0481 | 345/1.3 |
| 2003/0120711 A1* | 6/2003 | Katz | G06F 8/34 | 718/106 |
| 2003/0233367 A1* | 12/2003 | Uluakar | G06F 8/20 | |
| 2004/0015783 A1* | 1/2004 | Lennon | G06F 17/30389 | 715/235 |
| 2004/0181543 A1* | 9/2004 | Wu | G06F 17/30572 | |
| 2004/0225955 A1* | 11/2004 | Ly | G06Q 10/06 | 715/273 |
| 2005/0015745 A1* | 1/2005 | Wain | G06F 8/34 | 717/105 |
| 2005/0022160 A1* | 1/2005 | Uluakar | G06F 8/20 | 717/105 |
| 2005/0069107 A1* | 3/2005 | Tanaka | H04N 7/147 | 379/93.17 |
| 2005/0071305 A1* | 3/2005 | Hugh | G06F 17/3061 | 706/45 |
| 2006/0156246 A1* | 7/2006 | Williams | G06F 17/30265 | 715/764 |
| 2014/0379853 A1* | 12/2014 | Shelton | G06F 9/4868 | 709/217 |

OTHER PUBLICATIONS

Honeywell Users Group EMEA Presentation, 2013; https://www.honeywellprocess.com/en-US/online_campaigns/hug/Pages/emea/emea-2013presentations.html#.

Yokogawa Electric Corporation, Centum VP Overview; http://www.yokogawa.com/dcs/centumvp/overview/dcs-vp-0301en.htm.

* cited by examiner

PROXIMITY BASED CROSS-SCREEN EXPERIENCE APP FRAMEWORK FOR USE BETWEEN AN INDUSTRIAL AUTOMATION CONSOLE SERVER AND SMART MOBILE DEVICES

FIELD OF THE INVENTION

Exemplary embodiments relate to peer-to-peer communication, user interfaces, and particularly to monitoring industrial automation processes.

BACKGROUND

In the related art within Industrial Automation (IA), there are various control room features for monitoring and controlling the industrial automation process. The control room environment may include at least one human interface station (HIS) server or console. Presently, the primary human machine interface (HMI) interaction device for the console used by the control room operator is a wired, dedicated Operator keyboard. An exemplary dedicated Operator keyboard has hardware inputs, including normal QWERTY keyboard keys and dedicated keys preprogrammed to execute particular functions.

Typically, the control room console has one or more on-screen navigation User Interfaces (UI) that are provided to enable an operator to browse and search for available window call requests. Such requests are typically provided in the form of organized lists with soft targets as the keys to execute the window call-up.

Also, the control room console may have multiple monitor displays for displaying information of interest. The displaying of information on these multiple displays is controlled by the same dedicated Operator keyboard. Additionally, the dedicated Operator keyboard may provide function keys that are operative to control the provision of predetermined functions on a specific display through pre-programmed settings. In the related art, navigation and operation of the multiple displays for a console are controlled by the one dedicated Operator keyboard.

FIG. 1A illustrates a related art dedicated Operator keyboard 1, annotated to identify the various keys, key clusters and conventional structures (power supply wire, speakers, switches, etc.) that are common in the art. In the related art, the hardware Operator keyboard 1 has fixed programmable function keys 2, numeric keypad 3, buzzer/alarm key 4, contain window key 5, window call keys 6, built-in speakers 7, IEC 9241-11 key pitch 8, model selection switch 9, USB power supply 10, control keys 11, and operation confirmation keys 12. The dedicated Operator keyboard 1 for a console provides pre-programmed keys for screen interaction and process control.

FIG. 1B is a screen shot showing an on-screen Browser Bar UI for an IA console. The UI includes a navigation and call-up 14, shown on the left-side of the display, and an on-screen Pan/Zoom Control UI 15, shown on the top right corner of the display. System information 13 is displayed as an image of a system schematic with various conventional symbols and abbreviations used to identify various structures and features of the system.

SUMMARY

One or more embodiments of the disclosure relate to control of a console, or first device, in a control room by means of a companion device, or second device, through a peer to peer session framework. The use of the second device may provide additional capabilities beyond the pre-purposed capability provided by a dedicated Operator keyboard of the console server. Such a two-device control scheme and related structures and operations overcome the problems that operators are currently experience with the conventional limited hardware capabilities of the server and its components for supporting operator interaction.

According to an embodiment, either the first device or the second device searches for the other device based on a proximity-based peer-to-peer networking standard. Upon establishing a peer to peer session framework, the second device can be configured into an operating state suitable for interaction with the first device.

Also, the second device may serve as an input device for the console server. By using a second device, such as a mobile device, a control room operator may be given the capability to move away from a wired console and dedicated Operator keyboard. This is in contrast to the Operator keyboard, which is fixed in location and cannot be easily moved or re-connected to an alternate console server.

Further, the second device may have a touchscreen and be configured as a virtual keyboard or second human interface device input to the console. The second device may provide for a more expansive range of function keys or inputs than is possible compared to the hardware dedicated Operator keyboard.

In addition, the second device may provide information on its keys or functions, while also being configured as a human interface device. The functions may be dynamically labeled to indicate which functions are programmed and for what purpose. Also, a tap and hold feature for a function of the human interface device may provide additional information regarding the key. This provides for additional information to a user operator as to what each function does, and provides for additional information that cannot be found with a physical keyboard, such as a dedicated Operator keyboard.

According to an embodiment, information or a subject displayed on at least one display of the first device may be transferred or offloaded to a display of the second device. Accordingly, the display area of the at least one display of the first device can be utilized or optimized to show a desired information or subject.

Also, the second device can be used to create new functions or commands for the first device through the human interface device of the second device.

Further, multiple displays are connected to the console and the second device allows for selection of a function and then selection of a specific display to execute or display the function or command. This removes the need to program a specific function key on a hardware Operator keyboard to solely execute on one display. It also prevents the need to reprogram the function key depending on the displays removed or added to the console.

In addition, a configuration of the console may be stored in the second device. The configuration stored may comprise information arrangements or context for how information is displayed on the at least one display of the console.

The configuration stored in the second device may be used to automatically configure the first device upon establishing a future peer-to-peer session. Also, the configuration stored in the second device from a peer-to-peer session with a first device may be used to configure a third device, or second console.

Also, the second device may store multiple configurations. In a peer-to-peer session framework, the second device can be used to configure a connected console with one configuration from the plurality of configurations.

According to an embodiment, the sensors of the second device may be used to provide additional functionality. The second device may have a sensor such as a microphone or camera.

In an embodiment, the microphone of the second device can be used for voice recognition or voice command.

At least one sensor of the second device is used to capture context or information from the console. Exemplary captured information may include sound recordings or screen shots of the console. Also, captured information may be transmitted by another communications means to another device.

According to an embodiment of the disclosure, there is provided a method for exchanging information in a peer-to-peer session framework for industrial automation, the method including searching for a proximity-based availability of either a first device or a second device by the other device, the first device having a first input device; establishing the peer-to-peer session framework between the first device and the second device, the first device having a first operating state and the second device having a second operating state; and changing the configuration of the second device from a second operating state to a third operating state upon establishing the session with the first device configuring the second device in the third operating state as a second input tool to the first device.

The method for exchanging information in a peer-to-peer session framework for industrial automation further contemplates that the first device is connectable to the first input tool having a set of input functions or input methods; the first device is connectable to a first display; the second device is connectable to a second display; and configuring the second device with at least the same set of input functions or input methods as the first input tool to the first device.

The method for exchanging information in a peer-to-peer session framework for industrial automation further includes wherein the second display is configured to display information regarding an input function or input method of the second input tool.

The method for exchanging information in a peer-to-peer session framework for industrial automation further includes wherein the second display is a touchscreen display configured to display information regarding the input function of the second input tool when a contact is detected.

The method for exchanging information in a peer-to-peer session framework for industrial automation further includes, wherein the first device is connectable to a first display and the second device is connectable to a second display; displaying at least a first subject and a second subject on the first display in the first operating state of the first device, and changing the configuration of the first device from a first operating state to a fourth operating state upon establishing the session with the second device, wherein the second subject is displayed on the second display in the third operating state.

The method for exchanging information in a peer-to-peer session framework for industrial automation further includes a configuration wherein the second device is a mobile device and a sensor of the mobile device is configured to send data to the first device.

The method for exchanging information in a peer-to-peer session framework for industrial automation further includes a configuration wherein the second device has at least one of a microphone or camera configurable to send information.

The method for exchanging information in a peer-to-peer session framework for industrial automation further includes a capability to control the first device through voice recognition means of the second device.

The method for exchanging information in a peer-to-peer session framework for industrial automation further includes, wherein the first device is connectable to a first display and the second device having a second display; displaying a subject on the first display in the first operating state, and transferring the subject from the first display to the second display after establishing the peer-to-peer session framework.

The method for exchanging information in a peer-to-peer session framework for industrial automation further includes transmitting data from the first device to the second device; and transmitting the data from the second device to a third device through another communication method.

The method for exchanging information in a peer-to-peer session framework for industrial automation further includes configuring the first device based on settings stored in the second device.

The method for exchanging information in a peer-to-peer session framework for industrial automation further includes configuring the first device and the second device and storing a configuration, of the first device and the second device, in the second device; establishing a second peer-to-peer session framework between the second device and a third device; and configuring an operating state of the third device similar to the first device based on the stored configuration in the second device.

The method for exchanging information in a peer-to-peer session framework for industrial automation further includes, wherein the first device is connectable to a first display and a second display, displaying a subject on at least one of the first display and the second display based on an input to the second device.

The method for exchanging information in a peer-to-peer session framework for industrial automation further includes searching for a proximity-based availability of a third device by a second device and establishing the peer-to-peer session framework between the third device and the second device, thereby configuring the second device to communicate with both the first and third device.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein, and equivalent modifications. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

The terms used in the description are intended to describe embodiments only, and shall by no means be restrictive. Unless clearly used otherwise, expressions in a singular form include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

In contrast to the existing method of a wired dedicated Operator keyboard, interfacing with a console by a wireless method provides benefits to an Operator. By using a second device rather than a dedicated Operator Keyboard, which is wired to the console, the Operator would be able to freely move around a control room. In the past, prior to the keyboard, Operators felt more engaged walking up and down the control room wall with their clip board to make notes and create logs instead of sitting in front of consoles. Enabling an operator to walk around and in front of the display screens of a console while also using a smart tablet may allow him to interact more closely with what is happening in the process.

Figure 1A:
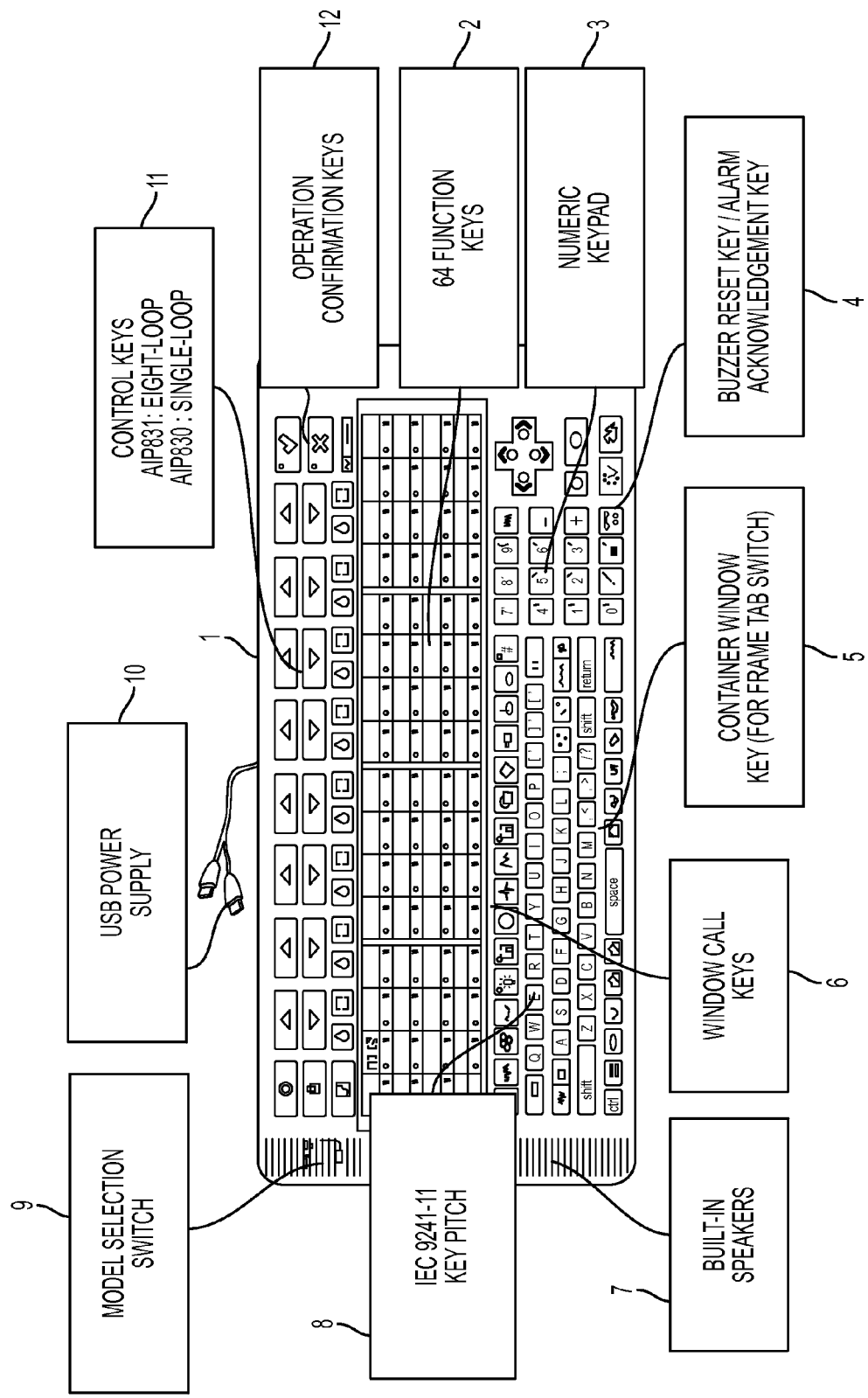
FIG. 1A illustrates a related art dedicated Operator keyboard.
Figure 1B:
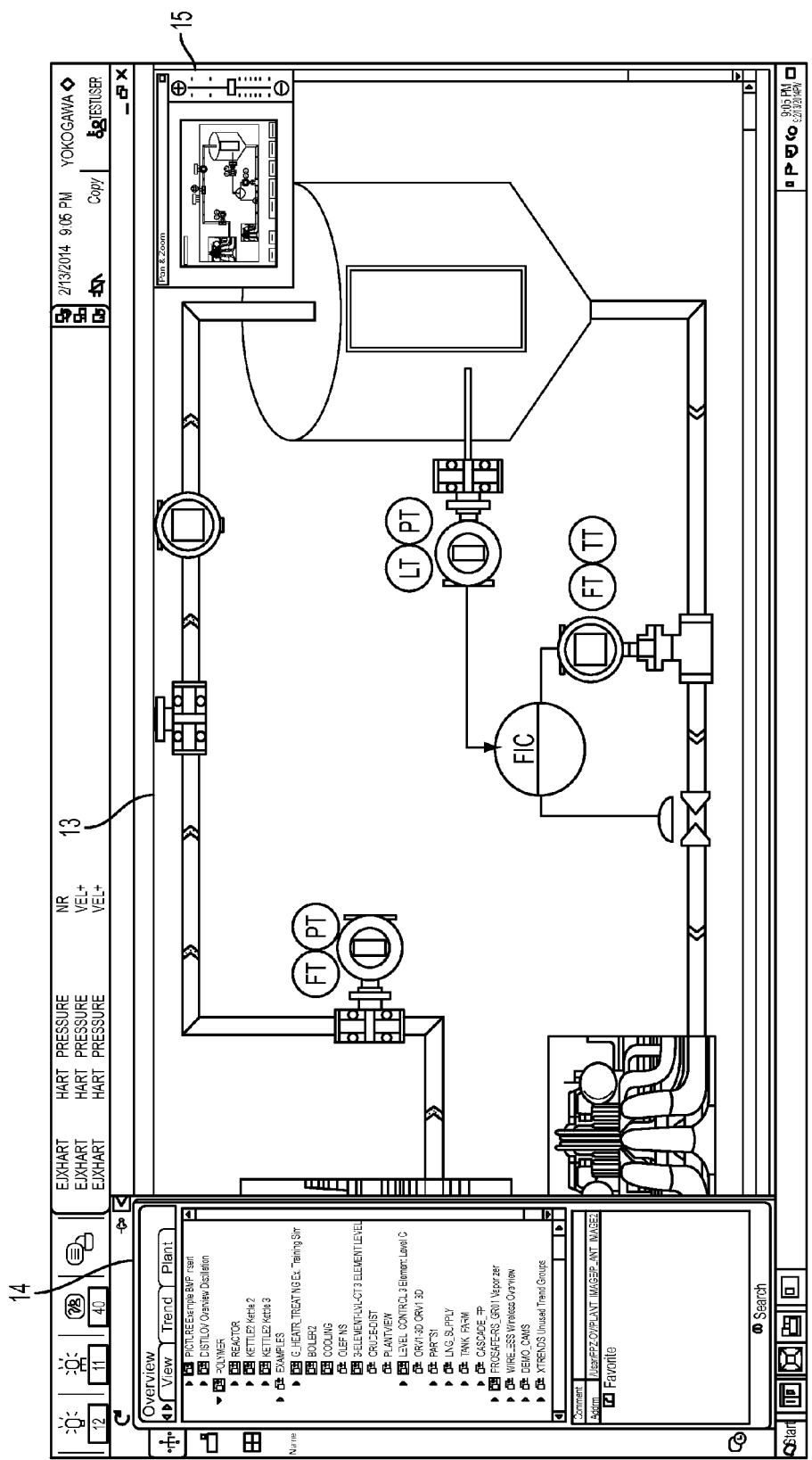
FIG. 1B illustrates a screen shot of a related art on-screen Browser Bar user interface for an IA console.

Also, offloading or removing interaction UIs from the console displays provides the ability to display more meaningful content rather than menus. As displays are of a finite size, the presence of the interaction UIs overlay the critical content of the view itself. FIG. 1B demonstrates this shortcoming where the interaction UIs take up space on the display. On screen interaction UIs overlay the meaningful content or reduces the amount of usable screen space for display of the meaningful content. The UI itself obscures the active screen content. With a dedicated Operator keyboard, the interaction UIs are needed to achieve the required functionality of the console. However, by moving the interaction UIs to a second device, it would be possible to display more of the critical content of the view on the at least one console display.

Exemplary embodiments address the issues and problems raised by previous methods in the related art.

Figure 2:
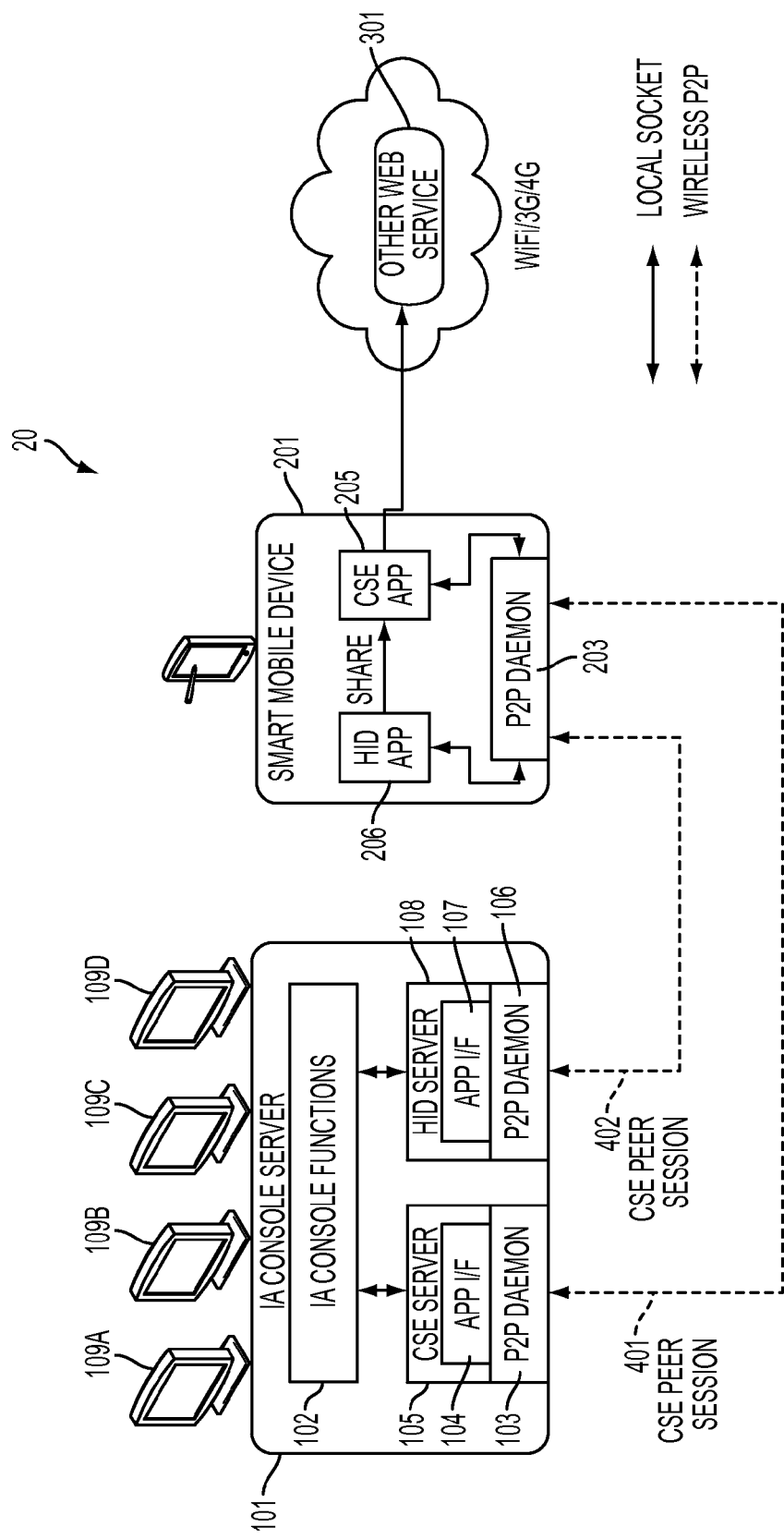
FIG. 2 illustrates screen shot of an exemplary system layout according to one preferred embodiment.

FIG. 2 shows an exemplary system architecture 20 of the present disclosure.

The exemplary system architecture 20 includes an industrial automation (IA) console server 101. The console server 101 is operated by a control room user operator. The console server 101 may support one or more locally connected monitor displays 109A-109D for display output of information. The IA console functions 102 are software components installed on the console server 101. The console functions 102 are used to support the human machine interface (HMI). The console server 101 includes at least one cross-screen experience (CSE) server 105 that exposes an implementation of the cross-screen experience App interface App I/F 104 for interaction with some aspect of the console functions 102. The console server 101 also includes a peer-to-peer (P2P) daemon 103 and is capable of supporting at least one wireless peer-to-peer protocol, e.g. [BLUETOOTH], [WI-FI DIRECT], [NFC], or the like. The P2P daemon 103 provides for a peer-to-peer service that provides the bus connection and session management function for the peer-to-peer messaging framework used over a proximity based wireless protocol. In addition to a proximity based protocol, additional special purpose protocols may be implemented. Each CSE server 105 can also support simultaneous sessions from multiple CSE Apps.

An exemplary embodiment of a CSE server is the Human Interface Device (HID) server 108. The HID server 108 is interacts with the console functions 102. The HID server 108 is implemented with an App interface 107 and P2P daemon 106.

The exemplary system architecture further includes a smart mobile device, or companion device 201. The companion device includes a peer-to-peer P2P daemon 203 and is capable of supporting at least one wireless peer-to-peer protocol, e.g. [BLUETOOTH], [WI-FI DIRECT], [NFC], or the like.

The companion device 201 includes a CSE App 205, the CSE App being a CSE client that encompasses an implementation of the cross-screen experience App interface for interaction with some aspect of the console functions 102. The console server 101 and the smart mobile device 201 can establish a CSE peer session 401, that is, an active peer session between a CSE server and CSE App. With this configuration, either device can initiate transmission of a message to the other device. Additionally, multiple CSE Apps can be installed and used on the companion device with the ability to share context between the CSE Apps. A CSE App 205 can connect to any available CSE server 105 within proximity. An exemplary embodiment of a CSE App 205 is the intelligent Human Interface Device (HID) App 206.

An exemplary embodiment of the system architecture of FIG. 2 establishes a CSE peer session 402 between the HID App 206 and the HID server 108.

The exemplary system architecture also can include connection by the smart mobile device to other web services 301. The web service can be deployed either to the Cloud or an on-premise web server that facilitates additional content access for a CSE App.

Although FIG. 2 illustrates an exemplary system with numerous components, one of ordinary skill would understand that the presence of each and every component is not required in the various embodiments.

Non-limiting examples of the smart mobile device 201, or companion device, include cellular phones, tablets, phablets, laptops, personal digital assistants, and the like.

By using a secured proximity based peer-to-peer networking technology (e.g. [BLUETOOTH], [WI-FI DIRECT], [NFC], or the like) a user operator can utilize the mobile device to search, locate, and connect to an available console server (CSE Server) within the near vicinity. Alternatively, the console server may establish the connection to the mobile device.

Once the mobile device 201 is connected to the CSE Server 101, a CSE Peer Session 401, 402 is established availing the mobile device as an intelligent companion device. Within the session, an installed Cross-Screen experience App on the mobile device is used to enable the user operator to interact with the content currently being displayed on the connected control room operation console. Non-limiting examples of the content may include Graphic, Trend, Alarm, Application, etc.

The console and companion device may also provide for additional security protocols in order to prevent unauthorized access.

A peer-to-peer messaging App framework exists to support display of extra data on the mobile screen that is synchronized with the content being viewed on the operation console. The unique capabilities of the mobile device (Touch, Voice, Camera, Location, Remote Networking, etc.) are used within the CSE App to enhance the Console Server's primary screen experience or to simply extend additional pertinent content to the mobile device's local screen.

According to one embodiment, the CSE App 205 on the companion device may be used to provide a human interface device for the user operator. The companion device 201 is connected to a console server 101 via a proximity based peer-to-peer service. Once connected, the HID App 206 is displayed on the companion device 201 providing access to the tools or inputs for utilizing cross screen features.

According to one embodiment, the features of the on-screen UI of the console displays may be removed from the displays in order to maximize display space of the desired system information or illustration 13. Instead, the features of the on-screen UI are displayed on a touchscreen of the companion device.

In one embodiment, the features of the on-screen UI displayed on the touchscreen of the companion device may be in multiple navigable menus including a tool box view, a preset builder view, a navigation view, and a touch mouse view.

Tool Box View

Figure 3:
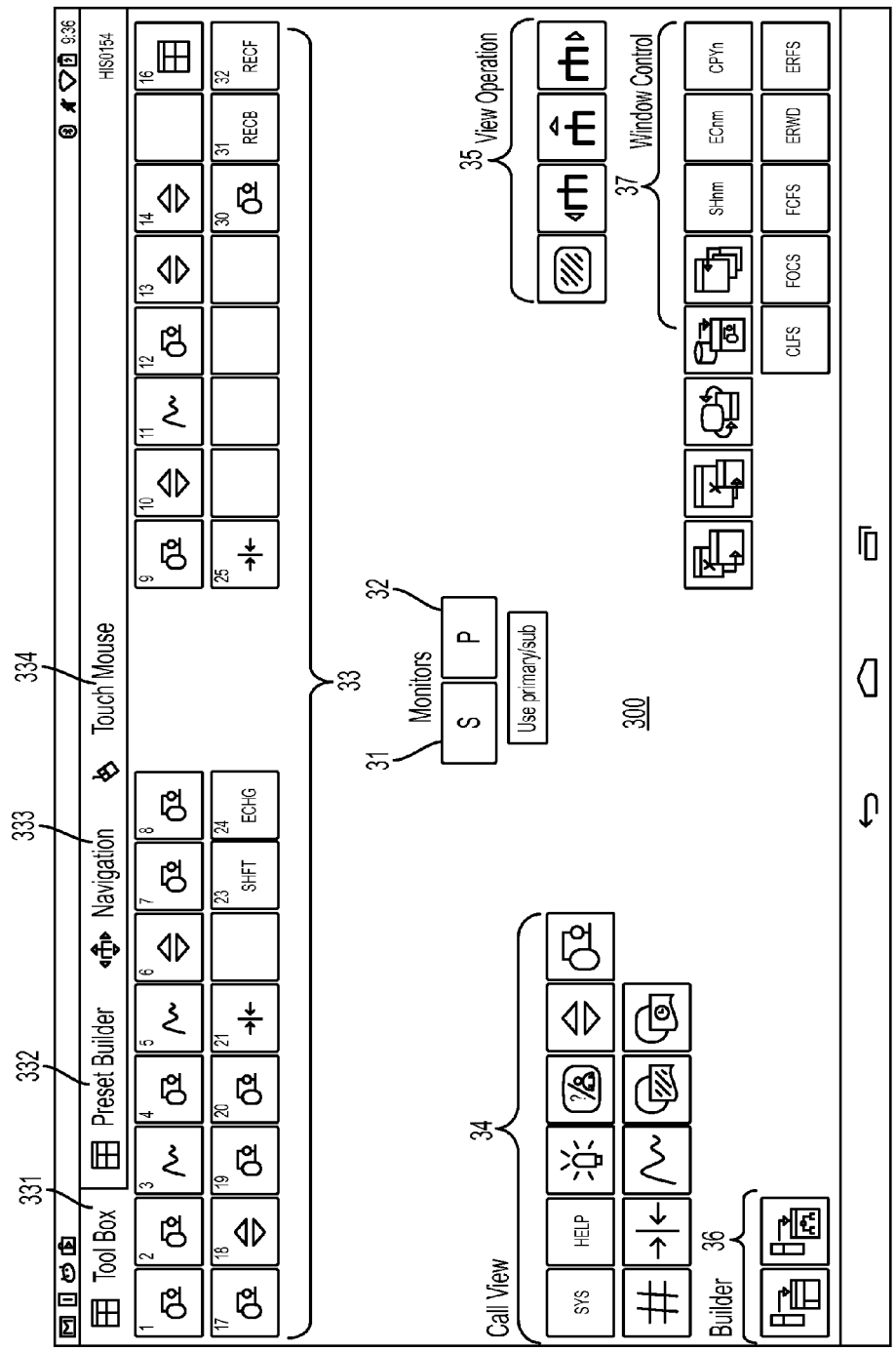
FIG. 3 illustrates screen shot of an exemplary Tool Box View according to an embodiment.

FIG. 3 shows a screen shot of an adaptive UI 300 displayed by the companion device 201 in a tool box view 331 after establishing a peer-to-peer session framework. By offloading the chrome of the UI to the companion device 201, the system information displayed by the displays of the console 101 are not obscured. The UI provides for selectable tabs for at least a tool box view 331, preset builder view 332, navigation view 333, and touch mouse view 334.

The tool box view 331 provides for selection of one or more of plural destination displays 31, 32 for key target requests. The layout of the displays in the UI 31, 32 is dynamically built based on the context of the connected console with regards to the number, layout, and orientation of the physical displays. The information for the layout may be collected by the console from the settings in the operating system of the console or by manual input and configuration in the settings, or the like.

In the exemplary layout illustrated in the screen shot of FIG. 3, the UI shows that the connected console has two physical displays 31, 32 oriented in a side-by-side layout. A target display can be selected by a simple tap on the corresponding display target. Screen content can be swapped or moved between displays through the use of touch gestures between the corresponding display targets. In one embodiment, pressing on one display element and sliding to another display element will swap the content between the displays. Alternatively, there can be selection of one display 32 as a primary display for the displaying of content.

While the exemplary UI in FIG. 3 has two displays, other numbers of displays may be used.

In one embodiment, as also illustrated in FIG. 3, the UI replicates and enhances the Operator keyboard experience for Window Call functions. In addition to the function keys 33, the UI may include toolbar options that would otherwise occupy space on a display. The UI may provide for Call View icons 34 which may provide for displaying particular graphics to provide information on the system. The Call View icons 34 may provide for graphics that show system status or hardware connected, an operations guide of notes for the operator, an overview graphic of the system, or the like. View Operation icons 35 may provide for navigation between desired graphics. For example, the View Operation icons 35 may provide for viewing of other sections of the system. Window Control icons 37 may provide for rearranging the graphical information displayed on the monitors. For example, the Window Control icons 37 may provide for cycling between views on a display. Builder icons 37 may provide for making and modifying the graphics by which system information is displayed. There may be text identifying the respective icons displayed.

In the embodiment of FIG. 3, the UI replicates and enhances the Operator keyboard experience for programmable function keys. The function key targets are dynamically labeled to provide an indication of which keys are programmed and for what purpose, as seen in keys 33. A tap & hold discover method is supported to enable the user operator to discern the specific programmed function associated with the key target prior to executing it.

The visibility of individual key elements 33 is contextually controlled so that the user operator is not confused with key elements options that are not usable based on the console settings and the current screen context. The visibility of the individual elements may be altered by means of changing the border, transparency of the elements, or the like.

In one embodiment, the UI may provide a touch-based pan or zoom experience for a selected console window. As opposed to typical on-console pan/zoom functions, the chrome of the pan/zoom control panel is completely offloaded to the companion device so as not to obscure content on the primary screens. The native touch gestures on the tablet can be used to control the zoom and pan interaction with the screen. The UI provided pan or zoom may be provided through a pop-up window from the tool box view on the companion device.

In one embodiment, the UI may provide a prioritized recommendation system in the tool box view of FIG. 3. Based on the context of the displays or previous actions by the user operator, the UI may generate a pop up window with a selection of likely to be useful functions. Selection of one of the selection of functions can result in execution on a display of the console and the generation of a subsequent selection of likely to be useful functions and so on.

Preset Builder View

Figure 4:
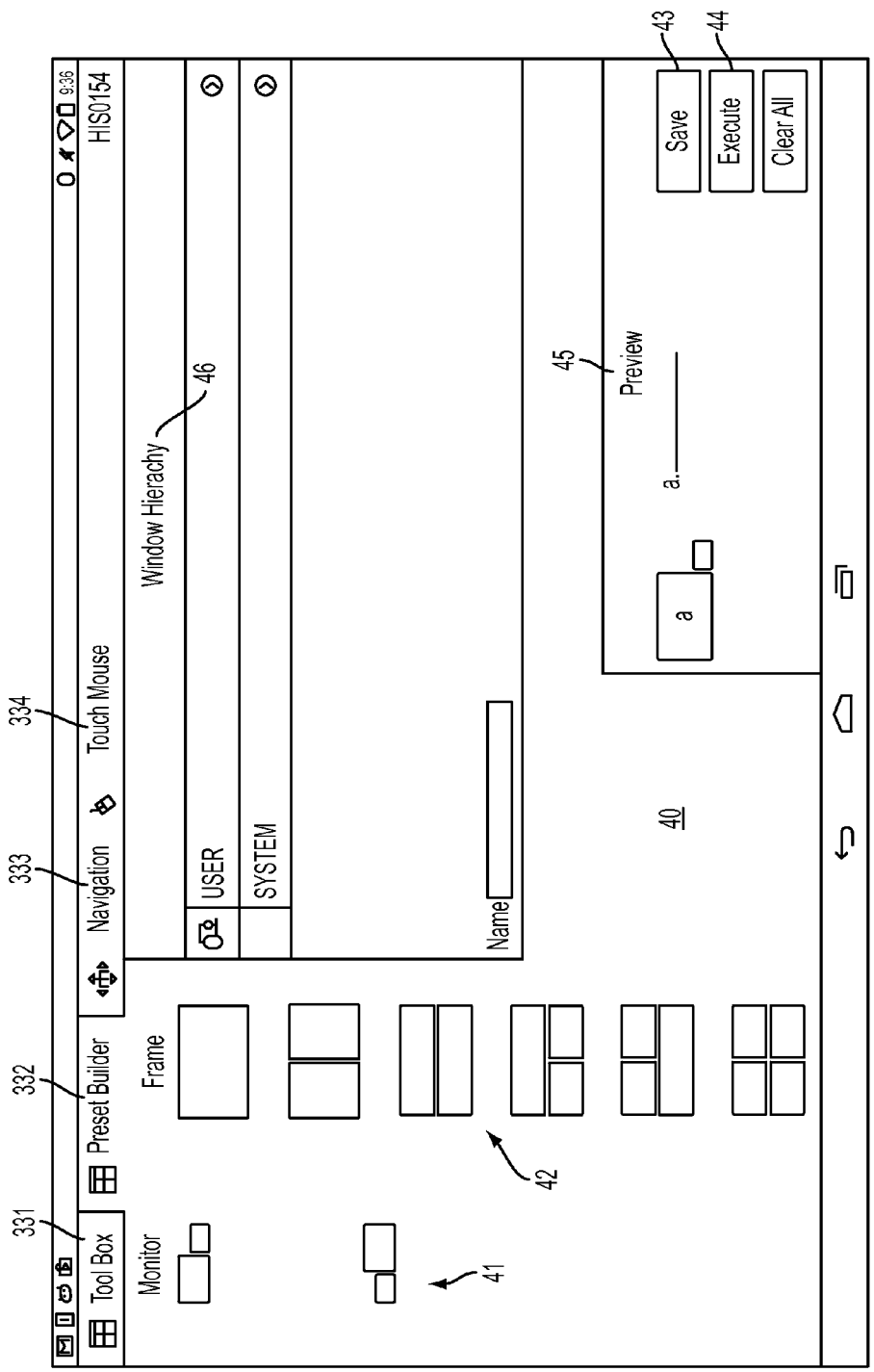
FIG. 4 illustrates screen shot of an exemplary Preset Builder View according to an embodiment.

FIG. 4 shows a screen shot of an adaptive UI displayed by the companion device in a preset builder view after establishing a peer-to-peer session framework. By offloading the chrome of the UI to the companion device 201, the system information displayed by the displays of the console 101 are not obscured.

In one embodiment, the UI replicates and enhances the preset menu builder experience for entering custom commands and building and executing preset menu entries for Frame and View commands in a multi-display console environment.

The layout of the preset builder view 40 adapts to the console context in terms of number and layout of displays, view mode (windowed or framed), and available elements (graphics, trends, panels, etc.). The preset builder provides a walkthrough method of saving context to the companion device.

Through the layout of the preset builder view 40, the operator is able to select the default display destination for the preset with the Monitor selection 41. The Monitor selection 41 represents the potential display configurations. With each potential display configuration, there is at least one smaller icon and a larger icon. The larger icon represents the default primary display in that configuration. The user selected display configuration may be indicated by being moved to the top of the preset builder view and have its graphic appearance different from the other possible configurations.

Based on the Frame selection column 42, the operator is able to select the frame style which defines how many commands are needed to be entered to populate the frames in the view. An exemplary configuration of the preset builder view provides for the selection of a display and the number of frames for display within the display. In FIG. 4, the exemplary configuration has selected a single frame on the display.

Using the Window Hierarchy list 46, the operator can browse and locate the desired elements or objects to populate into each frame when the preset is executed. The Preview list 45 shows each constructed command and its target destination by display and frame.

Once constructed, the preset can be executed 44 and/or saved as context 43 on the companion device for future re-use.

Navigation View

Figure 5:
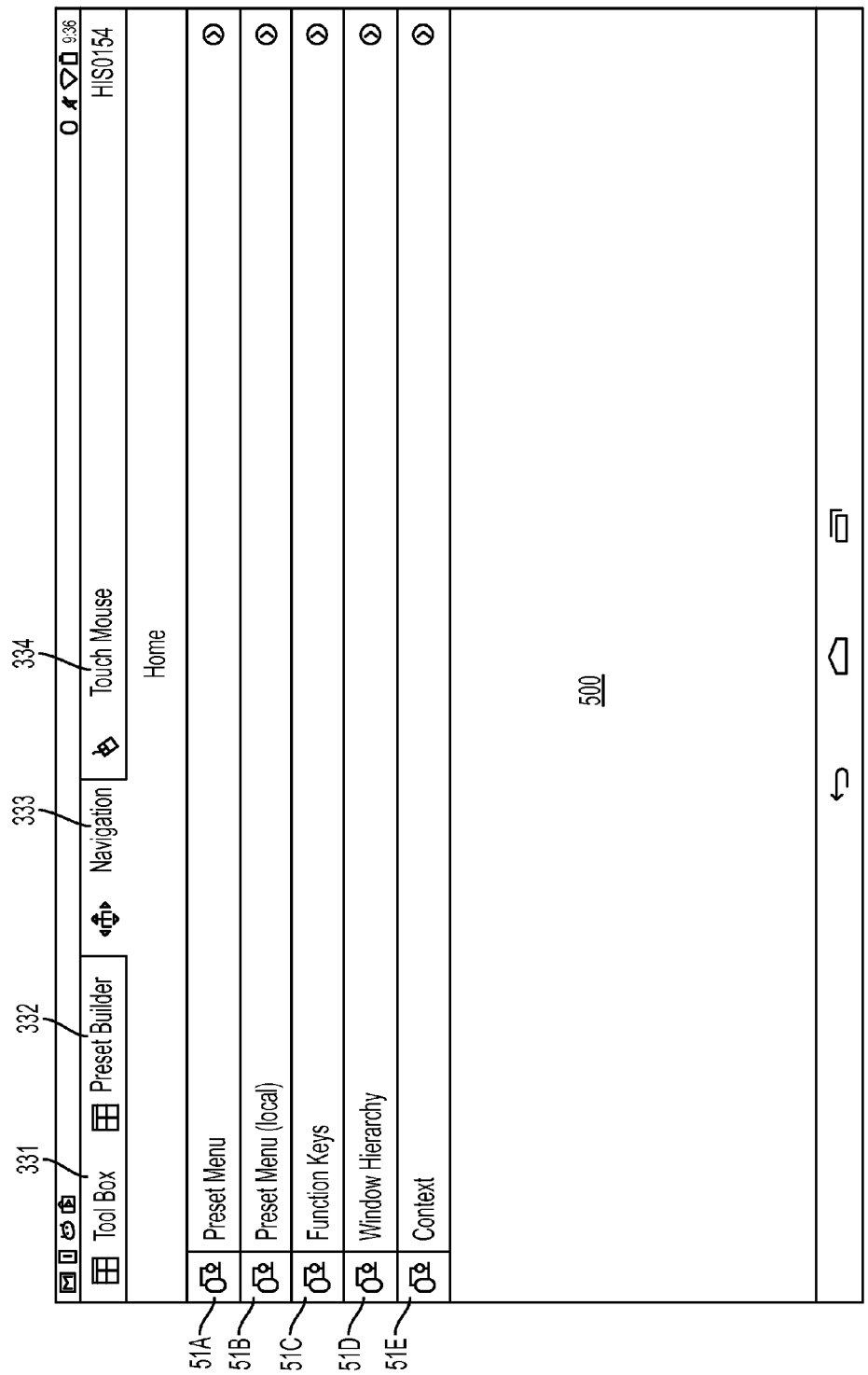
FIG. 5 illustrates screen shot of an exemplary Navigation View according to an embodiment.

FIG. 5 shows a screen shot of an adaptive UI displayed by the companion device in a navigation view 500 after establishing a peer-to-peer session framework. The navigation view provides a consolidated UI for exploring all elements that are available to send view content to a console display. At a top level, these elements are organized as presets 51A, 51B, function key definitions 51C, window hierarchy 51D, and previously saved context 51E. As each element type is explored, the description and resulting command associated with the element can be reviewed prior to executing the request. That is, a tap and hold or tap and release gesture to select one of the elements will show a next level of elements associated with the selected element. For example, selection of the function key definitions 51C may show a next level showing available function keys that a user may select.

The Presets and Context menus provide for exploring saved display arrangements. The function keys and Window hierarchy are for identifying elements to populate into a view.

In one embodiment, the UI is provided to enable the user operator to select the desired display as the target destination for the request.

In one embodiment, when exploring previously saved context elements for a console, the user operator is able to review and restore individual view elements or restore all active View elements from the saved context. This approach is useful to enable a user operator to quickly establish a working console scenario. Non-limiting considerations for establishing a working console based on saved context may include basis on time of day (e.g. operator shift change) or process condition (e.g. Boiler startup).

Since the saved context is stored on the companion device, the saving of context may be useful to quickly restore the working console context onto a different console altogether for alternate operating scenarios (multiple control rooms, "war room" investigation, loading pre-defined Operator Training Scenarios).

Touch Mouse View

Figure 6:
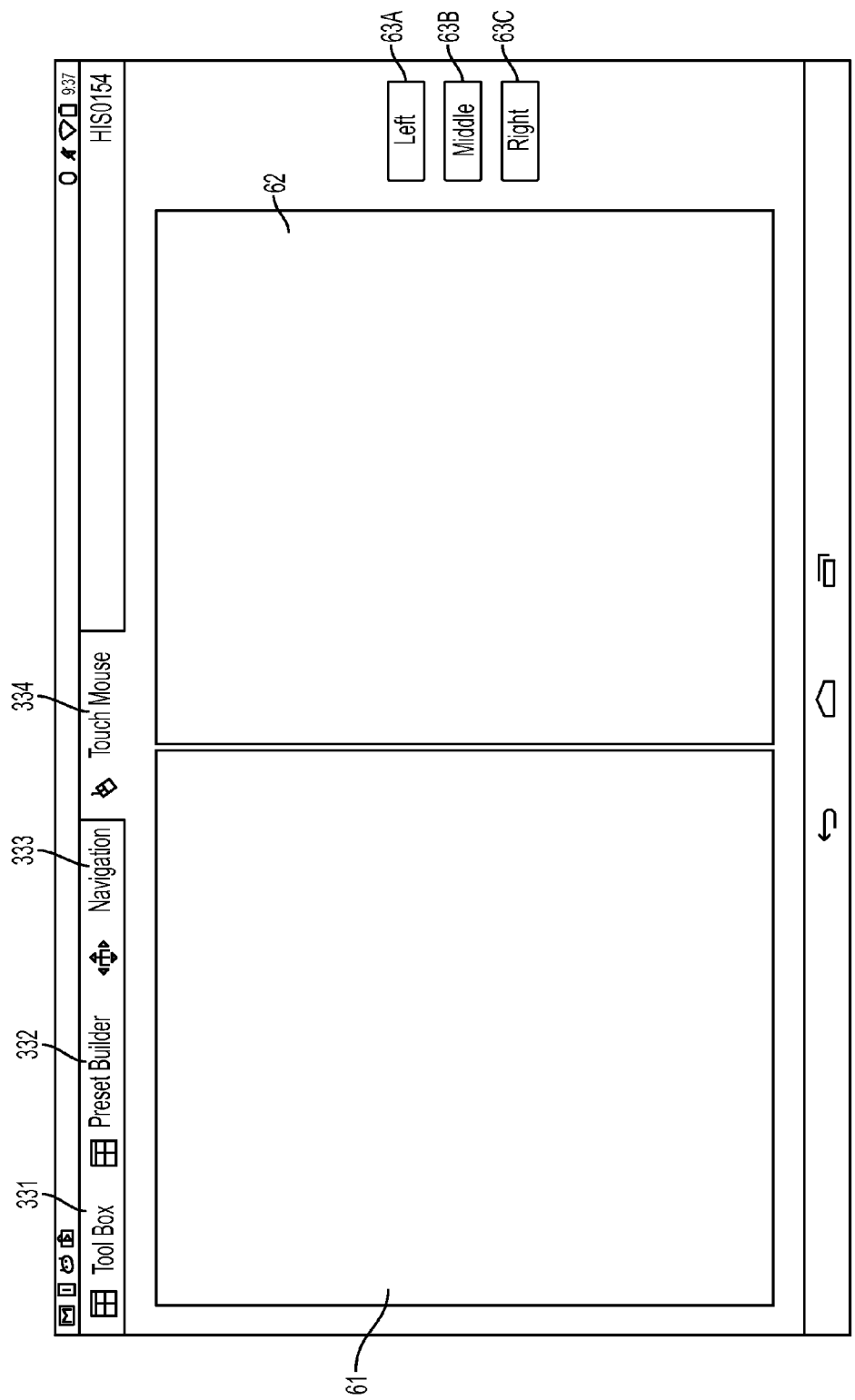
FIG. 6 illustrates screen shot of an exemplary Touch Mouse View according to an embodiment.

FIG. 6 shows a screen shot of an adaptive UI displayed by the companion device in a touch mouse view after establishing a peer-to-peer session framework. The UI provides a touch gesture experience, in lieu of a mouse, for window navigation and selection on the console displays. The UI is organized in coordinates based on the number and layout of the displays in the connected console. As shown in FIG. 6, the Touch Mouse View is connected to a console with two physical displays oriented in a side-by-side layout 61, 62. Touch swipes across the display coordinates can be used to control the movement of the cursor within and across displays. Mouse key presses may be achieved by at least double tapping on a cursor location or tapping an element for left 63A, middle 63B, or right 63C mouse keys.

In one embodiment, Multi-touch gestures are used to request mouse key (left, middle, right) presses at the current cursor location.

Use of Enhanced Sensors from the Companion Device

According to one embodiment of using the cross-screen experience App between a console server and a connected companion device in a control room environment, the sensors of the companion device can be used to provide additional functionality to the console.

In one embodiment, the companion device can provide addition support to the control room user operator's interaction with an offsite remote support center engineer. The connected companion device can be used by the control room user operator to gather the context of the current "problem incident" environment from the console. The context can be packaged with other ancillary data gathered via other sensors (Voice, Camera) and efficiently shared with the remote support engineer via an alternate wireless connection mechanism on the companion device (e.g. 3G/4G) that is not directly available from the console server itself.

In one embodiment, the companion device can record audio from the control room and send it to an offsite remote support center engineer. Or the companion device can record audio and store it for future analysis.

In one embodiment, the companion device can take a photograph or snapshot of the console and send it to an offsite remote support center engineer.

According to one embodiment, the advanced sensors available in the off the shelf mobile device hardware can be leveraged to seamlessly provide advanced alternate Operator interaction models with the IA console applications without impacting the integrity of the pre-existing console hardware and software. In one embodiment, the companion device can take a photograph or snapshot and transmit the image for display on the console displays. In one embodiment, the companion device can record audio and transmit the audio recording to the console.

According to one embodiment, the companion device may be used to support the launching of other context aware CSE Apps installed on the companion device. In one embodiment, a specialized CSE Trending App on the device can be launched by passing the current processing scope as context for the App. In its execution, the CSE Trending App can further aggregate content from both the CSE console environment and other data sources (e.g. Cloud-based data store) via an alternate wireless connection mechanism on the companion device. The CSE Apps may thus provide analytics and historical trends of the IA process operation that may be unavailable to the console alone. The CSE Apps may be downloadable from an App store.

According to one embodiment, the system may support scenario specific Operator training exercises. The companion device can be used by the Instructor to initialize the training scenario context onto the console. In one embodiment, specific context or information may be prepared for display on a console. The companion device would be able to connect with at least one console and set up a display of the at least one console with the training scenario. In this way, it may be possible to set up multiple consoles to simultaneously train multiple user operators.

Although this specification has been described above with respect to the exemplary embodiments, it shall be appreciated that there can be a variety of permutations and modifications of the described exemplary features by those who are ordinarily skilled in the art without departing from the technical ideas and scope of the features, which shall be defined by the appended claims.

A method of one or more exemplary embodiments may be recorded as computer-readable program codes in non-transitory computer-readable media (CD ROM, random access memory (RAM), read-only memory (ROM), floppy disks, hard disks, magneto-optical disks, and the like) including program instructions to implement various operations embodied by a computer.

While this specification contains many features, the features should not be construed as limitations on the scope of the disclosure or of the appended claims. Certain features described in the context of separate embodiments can also be implemented in combination. Conversely, various features described in the context of a single exemplary embodiment can also be implemented in multiple exemplary embodiments separately or in any suitable sub-combination.

Although the drawings describe the UI views in a specific order, one should not interpret that the UI views are performed in a specific order as shown in the drawings or successively performed in a continuous order, or all the UI views are necessary to obtain a desired result. Also, it should be noted that all embodiments do not require the distinction of various system components made in this description. The device components and systems may be generally implemented as a single software product or multiple software product packages.

A number of examples have been described above. Nevertheless, it is noted that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

There is claimed:

1. A method for exchanging information in a peer-to-peer session framework for industrial automation, the method comprising:
searching for a proximity-based availability of one of a first device and a second device by another of the first device or the second device, the first device having a first input tool;
establishing the peer-to-peer session framework between the first device and the second device, the first device having a first operating state and the second device having a second operating state;
changing the configuration of the second device from a second operating state to a third operating state upon establishing the session with the first device; and
configuring the second device in the third operating state as a second input tool to the first device,
wherein the first device comprises an industrial automation console server configured to monitor an industrial automation process.

2. The method for exchanging information in a peer-to-peer session framework for industrial automation of claim 1, wherein the first device is connectable to the first input tool having a set of input functions or input methods, the first device is connectable to a first display, and the second device is connectable to a second display, the method further comprising:
configuring the second device with at least the same set of input functions or input methods as the first input tool to the first device.

3. The method for exchanging information in a peer-to-peer session framework for industrial automation of claim 2, further comprising, configuring the second display to display information regarding an input function or input method of the second input tool.

4. The method for exchanging information in a peer-to-peer session framework for industrial automation of claim 3, wherein the second display is a touchscreen display configured to display information regarding the input function of the second input tool when a contact is detected.

5. The method for exchanging information in a peer-to-peer session framework for industrial automation of claim 1, wherein the first device is connectable to a first display and the second device is connectable to a second display, further comprising:
displaying at least a first subject and a second subject on the first display in the first operating state of the first device, and
changing the configuration of the first device from a first operating state to a fourth operating state upon establishing the session with the second device,
wherein the second subject is displayed on the second display in the third operating state.

6. The method for exchanging information in a peer-to-peer session framework for industrial automation of claim 1, wherein the second device is a mobile device and a sensor of the mobile device is configured to send data to the first device.

7. The method for exchanging information in a peer-to-peer session framework for industrial automation of claim 6, wherein the second device has at least one of a microphone or camera configurable to send information.

8. The method for exchanging information in a peer-to-peer session framework for industrial automation of claim 7, further comprising:
controlling the first device through voice recognition means of the second device.

9. The method for exchanging information in a peer-to-peer session framework for industrial automation of claim 1, wherein the first device is connectable to a first display and the second device has a second display, further comprising:
displaying a subject on the first display in the first operating state; and
transferring the subject from the first display to the second display after establishing the peer-to-peer session framework.

10. The method for exchanging information in a peer-to-peer session framework for industrial automation of claim 1, further comprising:
transmitting data from the first device to the second device; and
transmitting the data from the second device to a third device through another communication method.

11. The method for exchanging information in a peer-to-peer session framework for industrial automation of claim 1, further comprising:
configuring the first device based on settings stored in the second device.

12. The method for exchanging information in a peer-to-peer session framework for industrial automation of claim 1, further comprising:

configuring the first device and the second device;
storing a configuration of the first device and the second device in the second device;
establishing a second peer-to-peer session framework between the second device and a third device; and
configuring an operating state of the third device similar to the first device based on the stored configuration in the second device.

13. The method for exchanging information in a peer-to-peer session framework for industrial automation of claim 1, wherein the first device is connectable to a first display and a second display, further comprising:
displaying a subject on at least one of the first display and the second display based on an input to the second device.

14. The method for exchanging information in a peer-to-peer session framework for industrial automation of claim 1, further comprising:
searching for a proximity-based availability of a third device by a second device;
establishing the peer-to-peer session framework between the third device and the second device, and
configuring the second device to communicate with both the first and third device.

15. The method for exchanging information in a peer-to-peer session framework for industrial automation of claim 1, wherein the second device as a second input tool is configured to provide inputs corresponding to preprogrammed function keys of the first device.

16. An industrial automation console server for monitoring an industrial automation process, the industrial automation console server comprising:
at least one non-transitory computer readable medium operable to store program code;
at least one processor operable to read said program code and operate as instructed by the program code, the program code comprising:
searching for a proximity-based availability of a second device;
establishing a peer-to-peer session framework between the industrial automation console server and the second device, the industrial automation console server having a first operating state and the second device having a second operating state;
changing the configuration of the second device from a second operating state to a third operating state upon establishing the session with the industrial automation console server; and
configuring the second device in the third operating state as a second input tool to the industrial automation console server.

* * * * *